United States Patent
Sakimura et al.

(10) Patent No.: US 8,538,141 B2
(45) Date of Patent: Sep. 17, 2013

(54) CLASSIFIER LEARNING IMAGE PRODUCTION PROGRAM, METHOD, AND SYSTEM

(75) Inventors: Shigetoshi Sakimura, Hitachi (JP); Hiroto Morizane, Hitachi (JP); Shoji Muramatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 343 days.

(21) Appl. No.: 12/984,636

(22) Filed: Jan. 5, 2011

(65) Prior Publication Data
US 2011/0170769 A1   Jul. 14, 2011

(30) Foreign Application Priority Data

Jan. 13, 2010   (JP) ................................. 2010-004566

(51) Int. Cl.
*G06K 9/00*   (2006.01)

(52) U.S. Cl.
USPC .......................................... 382/159; 382/224

(58) Field of Classification Search
USPC .......................................... 382/159, 224, 118
See application file for complete search history.

(56) References Cited

U.S. PATENT DOCUMENTS

| | | | |
|---|---|---|---|
| 7,890,556 B2 * | 2/2011 | Date et al. | 707/831 |
| 8,107,689 B2 * | 1/2012 | Tsunoda | 382/118 |
| 2005/0220336 A1 * | 10/2005 | Sabe et al. | 382/159 |
| 2007/0047822 A1 * | 3/2007 | Kitamura et al. | 382/224 |

FOREIGN PATENT DOCUMENTS

| | | |
|---|---|---|
| JP | 07-021367 | 1/1995 |
| JP | 2001-273302 | 10/2001 |
| JP | 2006-293528 | 10/2006 |
| JP | 2006-343791 | 12/2006 |
| JP | 2009-080556 | 4/2009 |

* cited by examiner

*Primary Examiner* — Hadi Akhavannik
(74) *Attorney, Agent, or Firm* — Antonelli, Terry, Stout & Kraus, LLP.

(57) ABSTRACT

A classifier learning image production program, method, and system are provided which are capable of efficiently acquiring learning images to be employed in development of a discrimination application, or more particularly, efficiently acquiring initial learning images to be employed in an early stage of development of a discrimination algorithm. A classifier learning image production program allows a computer to execute the steps of inputting an image; detecting a discrimination area from the inputted image, acquiring plural detected data, and recording the detected data in a storage device; integrating the plural detected data to obtain learning image candidate information, and recording the learning image candidate information as the detected data in the storage device; clipping plural learning images from the inputted images, and recording the plural learning images as learning image data in the storage device; classifying the learning images into one or more sets; and displaying the learning images on a display device.

6 Claims, 11 Drawing Sheets

FIG. 3

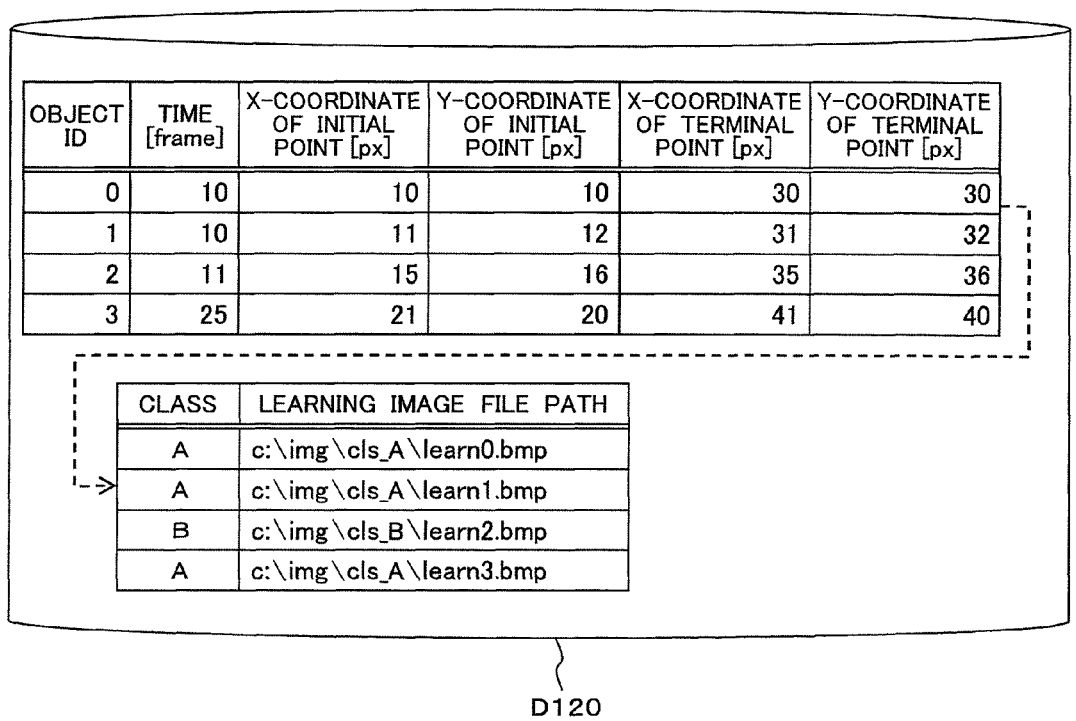

| OBJECT ID | TIME [frame] | X-COORDINATE OF INITIAL POINT [px] | Y-COORDINATE OF INITIAL POINT [px] | X-COORDINATE OF TERMINAL POINT [px] | Y-COORDINATE OF TERMINAL POINT [px] |
|---|---|---|---|---|---|
| 0 | 10 | 10 | 10 | 30 | 30 |
| 1 | 10 | 11 | 12 | 31 | 32 |
| 2 | 11 | 15 | 16 | 35 | 36 |
| 3 | 25 | 21 | 20 | 41 | 40 |

| CLASS | LEARNING IMAGE FILE PATH |
|---|---|
| A | c:\img\cls_A\learn0.bmp |
| A | c:\img\cls_A\learn1.bmp |
| B | c:\img\cls_B\learn2.bmp |
| A | c:\img\cls_A\learn3.bmp |

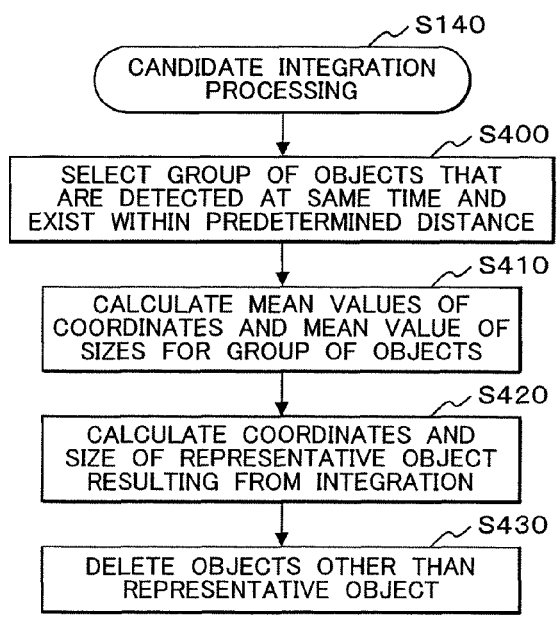

S140 CANDIDATE INTEGRATION PROCESSING

S400 SELECT GROUP OF OBJECTS THAT ARE DETECTED AT SAME TIME AND EXIST WITHIN PREDETERMINED DISTANCE

S410 CALCULATE MEAN VALUES OF COORDINATES AND MEAN VALUE OF SIZES FOR GROUP OF OBJECTS

S420 CALCULATE COORDINATES AND SIZE OF REPRESENTATIVE OBJECT RESULTING FROM INTEGRATION

S430 DELETE OBJECTS OTHER THAN REPRESENTATIVE OBJECT

CLASSIFIER LEARNING IMAGE PRODUCTION PROGRAM, METHOD, AND SYSTEM

CLAIM OF PRIORITY

The present application claims priority from Japanese Patent Application JP 2010-004566 filed on Jan. 13, 2010, the content of which is hereby incorporated by reference into this application.

FIELD OF THE INVENTION

The present invention relates to a technology for acquiring learning images for a classifier in development of an image recognition system using the classifier.

BACKGROUND OF THE INVENTION

Along with improvement in processing performance, image recognition systems have come to be applied to a wide range of fields from a conventional field of factory automation (FA) to a field of monitoring of people indoor or outdoor, recognition of faces by a digital camera or the like, or recognition of the external world by a vehicle camera.

In particular, in recent years, systems have been become general that perform not only detecting and tracing of an object but also discrimination of a type of object (for example, discrimination of a normal behavior from an abnormal one in monitoring people, and discrimination of a sex in recognition of faces).

Image discrimination applications (hereinafter called discrimination applications) generally employ a classifier, such as a neural network or a support vector machine (SVM), because a discrimination object is not rigid and deforms or it has diverse looks.

When the classifier is used to perform image discrimination, numerous learning images (teaching images), which are necessary for the classifier to learn, have to be acquired. Conventional work of acquiring learning image has to be manually performed, requiring numerous man-hours.

For example, for discrimination of an image having 10×10 pixels (this resolution is needed to visually decide the texture or shape of an object), when each pixel is regarded as a discrimination feature, the number of dimensions of the feature is 100. In general, it is said that the number of learning data that is ten or more times larger than the number of feature dimensions is necessary to achieve stable discrimination using the classifier. In this case, 1000 images per class are required as the learning data (as the number of classes to be discriminated increases, the number of necessary images increases).

Incidentally, the class signifies a "correct value" or an "incorrect value" to be given to the classifier during learning of the classifier. For example, in a case of discriminating a sex of a person, classification information such as "male" for a male image or "female" for a female image correspond to the class. Further, depending on the type of classifier, both a correct image and an incorrect image have to be included in learning images. For example, in the case of discriminating a sex of a person, aside from the male image and female image, a background image has to be intentionally learned as a class "others." In this case, the male image and female image are "correct images" and noise images including the background image are "incorrect images."

In the case of motion picture processing that handles discrimination of a moving object, there is work of clipping a learning image from each frame (or at intervals of a processing cycle). Therefore, in addition to the problem of man-hours, a problem arises that a learning algorithm does not converge or discrimination performance is not stabilized because satisfactory clipping work quality cannot be maintained, that is, a learning image area is deviated from a desired area.

In order to cope with the problems concerning acquisition of learning images, Japanese Unexamined Patent Application Publication No. 7-21367 discloses a system that increases the number of quasi learning images by manipulating initial images (for example, rotating the image or superposing noise), which are acquired in advance, through image processing. Japanese Unexamined Patent Application Publication No. 2006-293528 discloses a method of mapping a group of learning images, which is acquired in advance, onto a feature space employed in discrimination, and helping decide whether the group of images is acceptable as learning images.

However, the conventional method does not decrease man-hours required for the preceding work of acquiring numerous images. For example, the technology disclosed in Japanese Unexamined Patent Application Publication No. 7-21367 can increase the number of quasi data as long as initial images that are not manipulated are available. However, work of acquiring the initial images is separately needed. In addition, if a manipulation pattern (noise or the like) employed in producing the quasi images is inconsistent with a pattern of change obtained during actual imaging, discrimination performance may be adversely affected.

Further, for example, according to Japanese Unexamined Patent Application Publication No. 2006-293528, visual selection work for verifying whether acquired images are suitable for learning can be efficiently performed, but work of acquiring images that become objects of selection cannot be efficiently performed. In addition, the method includes a mapping to the feature space. Therefore, an effect is expected in additional learning for which a type of discrimination feature is already determined. However, in a stage preceding determination of a feature type in the course of developing an algorithm, no effect is expected at the time of initial learning since a mapping destination space is not fixed.

In particular, when a non-rigid body such as a person is discriminated or when a large image distortion is produced at some position in an image by using a wide-angle lens camera, it is necessary to acquire quite diverse and numerous images as initial learning images. Reducing man-hours for the work is a significant problem.

Accordingly, an object of the present invention is to provide a classifier learning image production program, a classifier learning image production method, and a classifier learning image production system which are capable of efficiently performing work of acquiring learning images to be employed in development of a discrimination application, or more particularly, efficiently performing work of acquiring initial learning images to be employed in an early stage of development of a discrimination algorithm.

SUMMARY OF THE INVENTION

A classifier learning image production program in accordance with the present invention allows a computer to execute the steps of inputting an image from a storage device or an image pickup device; detecting a discrimination area from the inputted image, acquiring a plurality of detected data including at least coordinate information on the discrimination area, and recording the detected data in a storage device; integrating the plurality of detected data so as to obtain learning image candidate information, and recording the learning image candidate information as the detected data in the storage device; clipping a plurality of learning images from the inputted images using the coordinate information included in the detected data, the learning images being necessary for a classifier to learn, outputting the plurality of the learning images as learning image data, and recording the learning image data in the storage device; classifying the learning images into one or more sets; and displaying the learning images on a display device.

A classifier learning image production method in accordance with the present invention includes the steps of inputting an image from a storage device or an image pickup device; detecting a discrimination area from the inputted image, acquiring a plurality of detected data including at least coordinate information on the discrimination area, and recording the detected data in a storage device; integrating the plurality of detected data so as to obtain learning image candidate information, and recording the learning image candidate information as the detected data in the storage device; clipping a plurality of learning images from the inputted images using the coordinate information included in the detected data, the learning images being necessary for a classifier to learn, outputting the plurality of the learning images as learning image data, and recording the learning image data in the storage device; classifying the learning images into one or more sets; and displaying the learning images on a display device.

A classifier learning image production system in accordance with the present invention includes a display device, an input device, a storage device, and an information processing device executing the foregoing classifier learning image production program or implementing the foregoing classifier learning image production method.

According to the present invention, efficient work is possible for acquiring classifier learning images to be employed in development of a discrimination application. In particular, work can be efficiently performed for acquiring not only additional learning images, which are used at the time of additional learning succeeding completion of development of an image discrimination algorithm, but also initial learning images to be employed in an early stage of the development.

BRIEF DESCRIPTION OF THE DRAWINGS

FIG. 3 is a diagram showing a data structure and an example of detected data;

FIG. 4 is a flowchart of candidate integration processing;

DESCRIPTION OF THE PREFERRED EMBODIMENTS

Embodiments of a classifier learning image production program, a classifier learning image production method, and a classifier learning image production system in accordance with the present invention will be described below with reference to the drawings. In the embodiments below, for a better understanding, a discrimination area will be described as an object (entity) such as a person or a vehicle. The present invention can deal with something other than the object (entity) as the discrimination area. For example, the present invention can apply to a case where an image of a defective part in a field of FA inspection is designated as the discrimination area. In this case, a description below for the object should be interpreted as a description for the area.

First Embodiment

An embodiment of a classifier learning image production program, a classifier learning image production method, and a classifier learning image production system in accordance with the present invention will be described below with reference to FIG. 1 to FIG. 7.

In the present embodiment, recognition of road signs by a camera mounted on the front part of a car will be described as an example of automatically acquiring learning images in motion picture processing.

Figure 1:
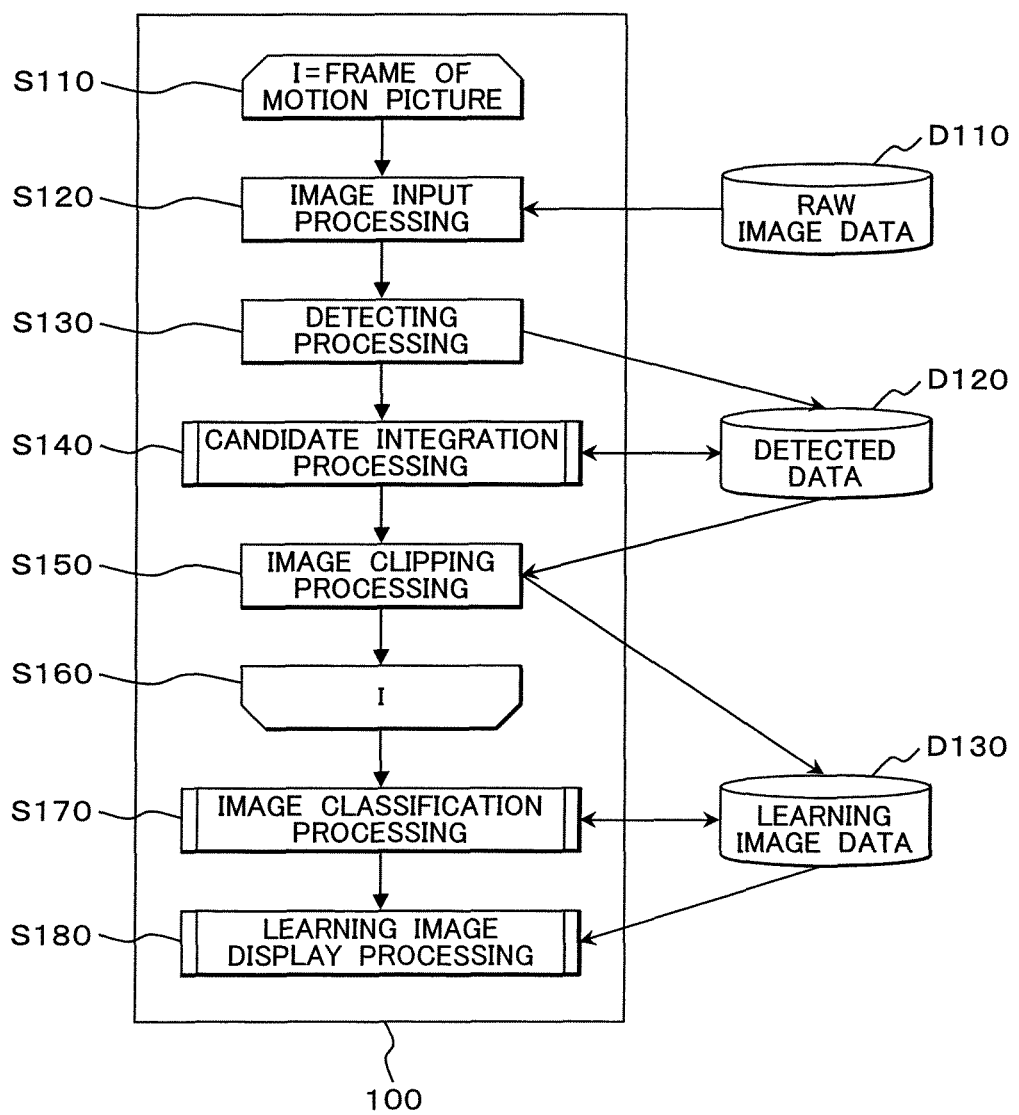
FIG. 1 is a diagram outlining a classifier learning image production program in accordance with a first embodiment of the present invention and data processing.

Referring to FIG. 1, the classifier learning image production program in accordance with the present embodiment and data processing will be outlined below. The classifier learning image production program 100 of the present embodiment includes processing steps of loop processing S110, loop processing S160, image input processing S120, detecting processing S130, candidate integration processing S140, image clipping processing S150, image classification processing S170, and learning image display processing S180, and inputs or outputs data such as raw image data D110, detected data D120, and learning image data D130. The loop processing S110 and S160 allow the processing of steps S120 to S150 to be applied to each of frames (or processing cycles) of a motion picture.

The processing cycle refers to a cycle needed to complete a series of motion picture processing including image inputting, recognition processing, and results displaying. In the present embodiment, the processing cycle refers to a cycle conformable to a video standard, for example, 66 ms.

The raw image data D110 is image data that is taken in advance and includes a scene in which a discrimination object appears. The raw image data D110 is used as an input image (raw image). Since the present embodiment is concerned with motion picture processing, the raw image data D110 is a motion picture data file. The raw image data D110 can be a group of still images in the present invention.

The detected data D120 includes information concerning an object detected through the detecting processing S130, such as an ID of the object or positional information on the object, for example. The candidate integration processing S140 is performed on the detected data D120. The detected data D120 will be detailed later.

The learning image data D130 includes data obtained as a result of completion of the series of the processing (S110 to S170) by the classifier learning image production program 100. More particularly, the learning image data D130 includes the detected data D120 that is finally obtained with information added through the image classification processing S170, and includes a group of learning still image files.

A processing procedure by the classifier learning image production program 100 will be outlined below.

First, one raw image is fetched from the raw image data D110, and partial images that serve as candidates for learning images and coordinate information on the partial images are extracted from the raw image (step S110 to S160). The steps S120 to S150 will be concretely described below.

To begin with, a still image corresponding to each frame (or processing cycle) of a motion picture is clipped from the raw image data D110, and inputted as a raw image (step S120).

Detecting processing is performed on the still image (raw image) in order to obtain object coordinates of a portion in which a discrimination object appears (in the present embodiment, coordinates of an initial point and a terminal point of a bounding rectangle of the object). In the detecting processing, plural object coordinates (a group of object coordinates) are obtained from one raw image. The group of object coordinates obtained at this time point is not needed to be strictly correct coordinates and can include a noise. The obtained group of object coordinates is recorded in the detected data D120.

Thereafter, mutual positional relationships are checked for the obtained group of object coordinates, and the candidate integration processing (step S140) is performed on the group of object coordinates which exhibits a high possibility that the same object may be erroneously detected. This candidate integration processing will be detailed later.

Through the foregoing processing, one set of object coordinates is obtained for one object. Then, an area indicated by the object coordinates is clipped as a partial image, and the partial image is recorded in the learning image data D130 (step S150). The partial image recorded in the learning image data D130 is data from which a noise (an improper result of detecting) has been deleted, and becomes a candidate for a learning image (learning image candidate).

The foregoing processing of steps S120 to S150 are applied to each frame (or processing cycle) I of a motion picture (steps S110 and S160).

After the motion picture in the raw image data D110 is processed at steps S110 to S160, a group of clipped partial images (learning image candidates) is classified (step S170). The image classification processing will be detailed later.

Finally, a group of images adopted as learning images is displayed (step S180). The learning image display processing will be detailed later.

As a detecting method employed in the detecting processing S130, a different technique may be adopted for each discrimination application (image discrimination application), and a known method may be adopted. For example, as for circular sign recognition performed by a car-mounted camera, which is taken for instance in the present embodiment, circle detection using a separability filter or the Hough transform method is adopted. For invader detection by a fixed camera, person detection by a frame subtraction method or a background subtraction method is adopted. A detecting method employed in the present invention is not restricted to any of these detecting methods.

As a method of obtaining the raw image data D110 and the learning still images in the learning image data D130, a known method may be adopted. For example, as a general method, they are obtained as movie data or image file data in a file system supported by the operating system.

Further, in the present embodiment, motion picture data is inputted from the raw image data D110, as an example, in the image input processing S120. Alternatively, any other inputting method may be adopted. For example, an image pickup device, such as a camera, is connected to the image recognition system and each frame may be directly fetched and inputted in real time from a motion picture picked up by the image pickup device.

Figure 2:
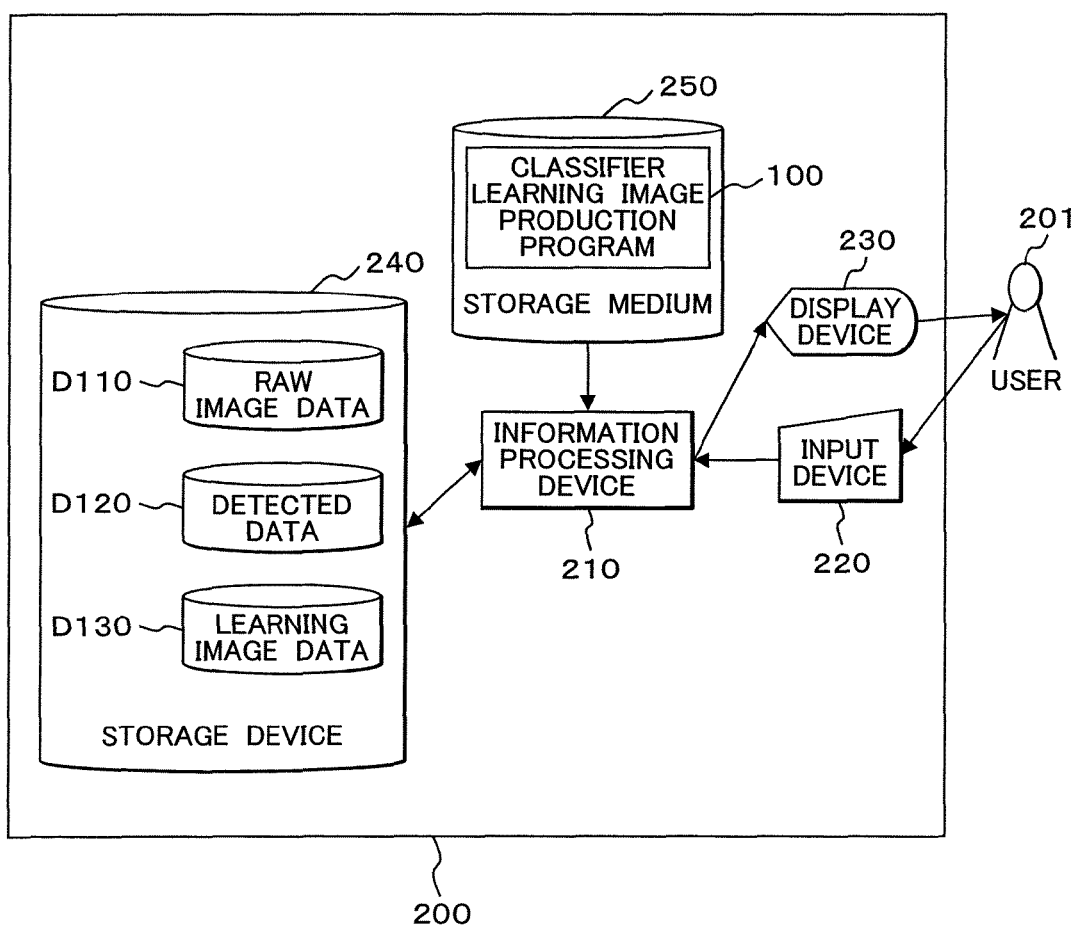
FIG. 2 is a diagram showing a configuration of a classifier learning image production system in accordance with the first embodiment.

FIG. 2 shows a configuration of a classifier learning image production system of the present embodiment. The classifier learning image production system 200 of the present embodiment is configured with a computer, or more particularly, includes an information processing device 210, an input device 220, a display device 230, a storage device 240, and a storage medium 250.

In the storage medium 250, the classifier learning image production program 100 is recorded. The classifier learning image production program 100 is a classifier learning image production program of the present embodiment, recorded in a computer-executable form in the storage medium 250, and read and executed by the classifier learning image production system 200.

The information processing device 210 is responsible for the whole processing performed by the classifier learning image production system 200, and executes the classifier learning image production program 100.

The input device 220 executes processing relevant to inputting by a user 201 among the processing performed according to the classifier learning image production program 100. More particularly, the input device 220 handles inputting of data through a learning image display screen described later.

The display device 230 executes processing relevant to displaying for the user 201 among the processing performed according to the classifier learning image production program 100. More particularly, the display device 230 controls displaying of the learning image display screen described later.

In the storage device 240, the raw image data D110, the detected data D120, and the learning image data D130 are stored. For these data, the information processing device 210, the input device 220, and the display device 230 execute data processing, input processing, and display processing, respectively.

In the present embodiment, the storage device 240 and the storage medium 250 are handled as a device and a medium that are independent of each other. Alternatively, the storage device 240 and the storage medium 250 may be the same device or medium. For example, the classifier learning image production program 100 may be stored in the storage device 240 or may be stored in another computer (different from the computer that executes the classifier learning image production program 100) which is accessible over a communication network.

The storage device 240 and the storage medium 250 are not limited to any specific ones in the present embodiment. For example, they may be a hard disk drive or a semiconductor memory.

Although the classifier learning image production system is configured with a single computer in the present embodiment, the classifier learning image production system in accordance with the present invention is not always realized with a single computer. For example, when two computers have the ability to communicate with each other, the input device 220 and the display device 230 in one of the computers may be utilized to implement input processing and output processing, and the information processing device 210 and the storage device 240 in the other computer may be utilized to implement data processing and storage processing. In other words, either a stand-alone system or a multi-client system, such as a web system, can configure the classifier learning image production system of the present invention.

FIG. 3 shows a data structure and an example of the detected data D120. The detected data D120 is data of information (object information) concerning an object detected through the detecting processing S130 (FIG. 1), and includes such information as an object ID, an object-detected time, positional information on the object, class information, and a path to the learning image file (FIG. 3 has a table divided into two portions for convenience, but an actual table has each line extended in a row for each object ID). Among the information, the class information and the path to the learning image file are designated through the image classification processing S170.

The object ID is an identifier that specifies individual object information.

The object-detected time indicates a temporal position at which an object has been detected. In the present embodiment, a motion picture frame number is adopted as a management unit of time. Therefore, the object-detected time signifies in what frame of the inputted motion picture the object has been detected. Incidentally, an actual time (year/month/day, hour/min/sec/msec, etc.) may be adopted as the time unit.

The positional information on the object is represented by object coordinates of the detected object, that is, coordinates of an initial point of a bounding rectangle of the object in an image space, and coordinates of a terminal point thereof. In the present embodiment, a pixel position in the image space is adopted as a management unit of coordinate. Alternatively, three-dimensional coordinates in a real space may be adopted as the coordinate unit.

The class information indicates the class to which the object appearing in the learning image belongs.

The learning image file path indicates the path to a file including a partial image (learning image candidate) in which an object appears.

After the class information and the path to the learning image file are set in the detected data D120 through the image classification processing S170, the detected data D120 is registered in the learning image data D130.

FIG. 4 shows a flow of the candidate integration processing S140 shown in FIG. 1.

First, objects (a group of objects) that have been detected at the same time and exists within a predetermined distance are selected from among a group of the object information registered in the detected data D120 (step S400). In the present embodiment, the predetermined distance shall be given in advance by a user.

Thereafter, mean values of coordinates and a mean value of sizes are calculated for the selected group of objects (step S410).

Based on these mean values, coordinates and a size are calculated of a representative object (step S420) which is an object into which the group of objects is integrated. Examples of a concrete calculation method include a method of selecting as the representative object one object which has the closest size to the mean value, from among the group of objects that are not integrated, a method of obtaining a size from mean coordinates (representing the initial point and representative object terminal point) and redefining an area of the representative object, and a method of obtaining coordinates of the terminal point from mean coordinates of the initial point and the mean size and redefining the area of the representative object.

Finally, the object information is deleted among the group of objects that are not integrated (step S430), except for the object information on the representative object (object resulting from integration).

Figure 5:
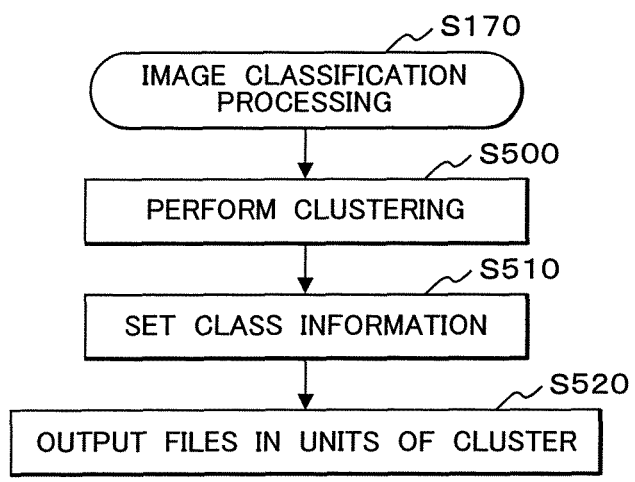
FIG. 5 is a flowchart of image classification processing in accordance with the first embodiment.

FIG. 5 shows a flow of the image classification processing S170 shown in FIG. 1.

A group of partial images (learning image candidates) clipped through the image clipping processing S150 is subjected to clustering processing (step S500) in order to classify the learning image candidates into one or more sets (clusters). More particularly, for example, each pixel value of an image is regarded as a feature vector, and one feature vector is determined for each image. Thereafter, the feature vectors of the images are clustered according to a known clustering method (for example, a k-means method or a mean-shift method).

Thereafter, an identification code is assigned to each of the clusters obtained through the clustering processing. The identification code is, regarded as a class name to which each image belongs, set in the class information (see FIG. 3) in the detected data D120 (step S510).

Finally, image files are outputted in units of cluster, and learning image file paths (see FIG. 3) are set in the detected data D120 (step S520). The image files are outputted in units of cluster by dividing output folders.

Figure 6:
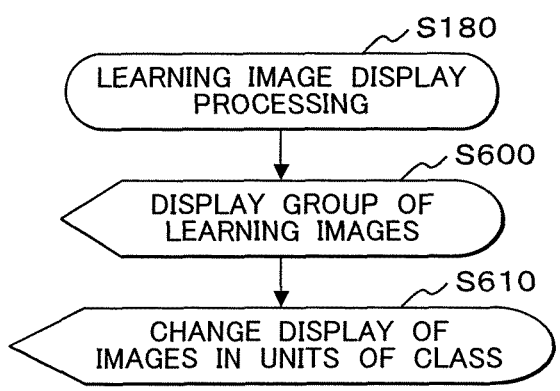
FIG. 6 is a flowchart of learning image display processing in accordance with the first embodiment.

FIG. 6 shows a flow of the learning image display processing S180 shown in FIG. 1.

A group of finally adopted learning images is displayed in the form of a list (step S600).

Thereafter, the display (the displayed state) of each of the learning images is changed in units of class in order to show the class to which each of the displayed leaning images belongs (step S610). This example of display will be described with reference to FIG. 7.

Figure 7:
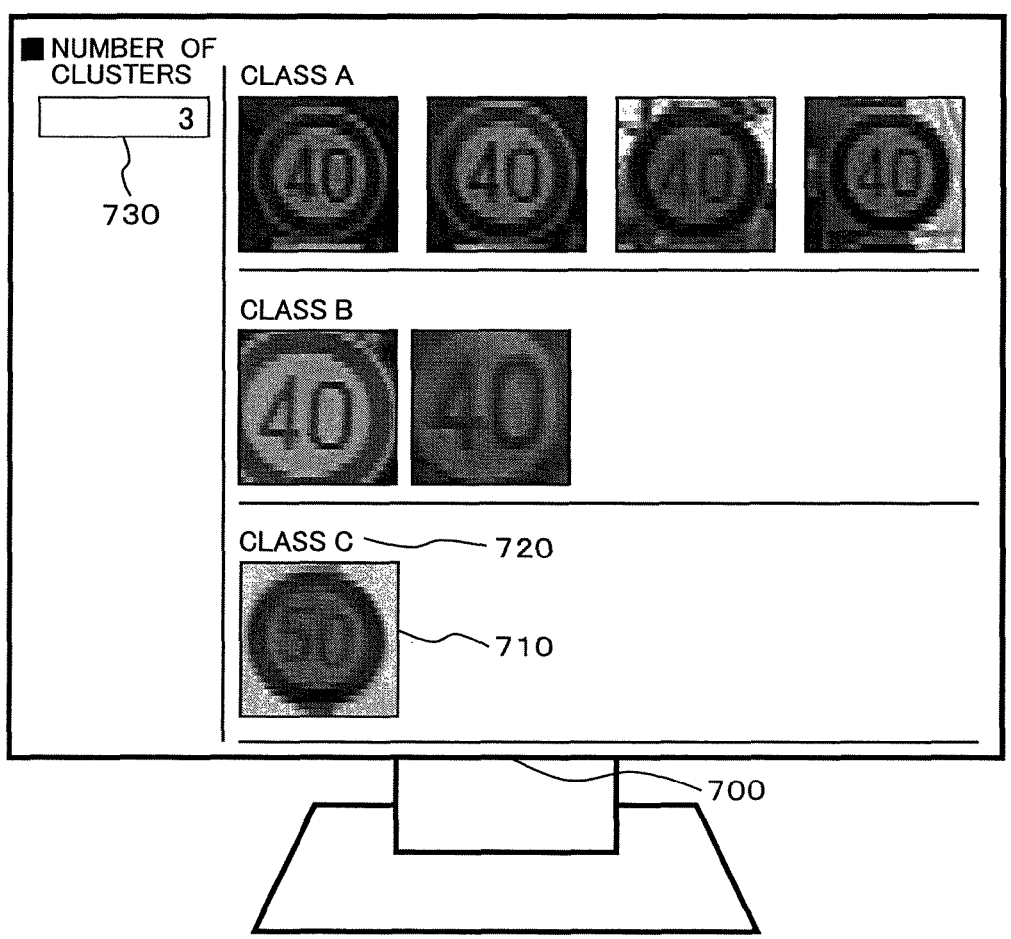
FIG. 7 shows an example of a learning image display screen in the first embodiment.

FIG. 7 shows an example of the learning image display screen displayed through the learning image display processing S180. In the learning image display screen 700, reduced learning images 710, and class information 720 indicating a class to which each of the learning images 710 belongs are displayed as display information concerning the respective learning images. In addition, a parameter 730 employed in clustering is displayed. In the example shown in FIG. 7, the number of clusters into which images are classified is set to 3 and clustering is performed using the k-means method. Therefore, the number of clusters is displayed as the parameter 730. The learning image display screen 700 is displayed on the display device 230 (FIG. 2).

In the learning image display screen 700, the display of each of the learning images 710 is changed and the learning images 710 are displayed in units of class.

In the present embodiment, as a method of changing the display (displayed state) of the learning images 710 in units of class through the learning image display processing S180 (S610), a list-form display is presented as an example of display where the rows are divided by the classes as shown in FIG. 7. A method for controlling a display of the learning images is not limited to the one according to the example of display shown in FIG. 7 and any other method may be adopted. For example, a method may be adopted of displaying the reduced learning images in the form of a scatter diagram with the colors of the frames of the reduced learning images varied in units of class.

According to the configuration of the first embodiment, when a detecting algorithm exhibiting a practical performance is available, improper results of detecting are deleted from results of detecting including noises, and candidates for learning images are clipped out. Further, the candidates are automatically classified into classes and assigned class names. Learning image files are thus produced and displayed. Even if noise images remain in the group of the learning image files, the noise images are classified into a (small-scale) noise cluster other than clusters of correct images, and then outputted. Therefore, man-hours required for work of visually removing the noise images in a succeeding stage are reduced.

Second Embodiment

Another embodiment of a classifier learning image production program, a classifier learning image production method, and a classifier learning image production system in accordance with the present invention will be described below with reference to FIG. 8 to FIG. 11.

In the present embodiment, an example will be described where, during motion picture processing, candidates for the learning images are automatically acquired but final selection of whether adopting the candidates as the learning images is manually made by a user. The present embodiment is useful in a case where performance of detecting processing is poor, such as in an early stage of development of an image recognition algorithm.

Figure 8:
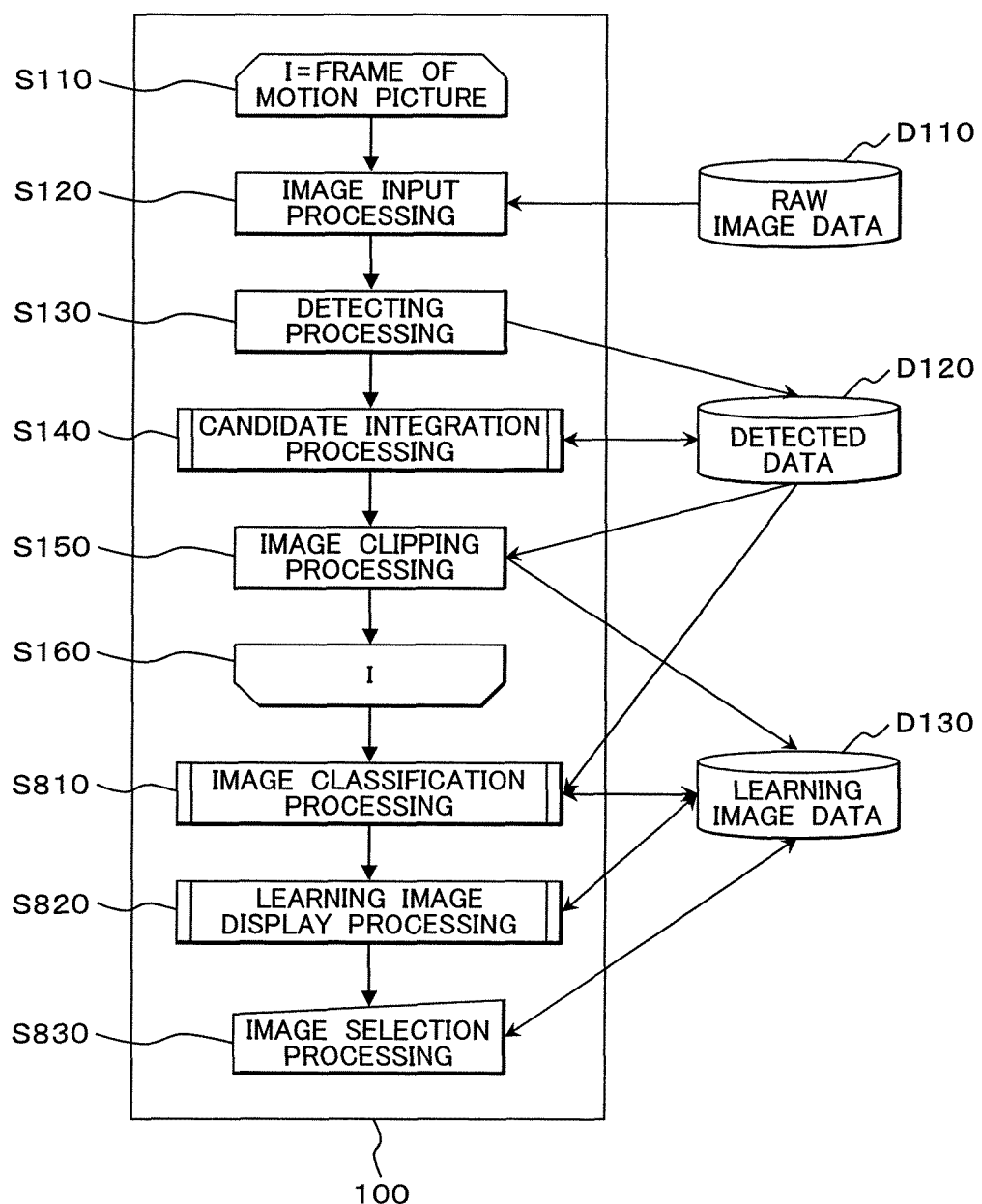
FIG. 8 is a diagram outlining a classifier learning image production program in accordance with a second embodiment of the present invention and data processing.

Referring to FIG. 8, overall processing by the classifier learning image production program of the second embodiment will be outlined below. The classifier learning image production program 100 of the second embodiment includes processing steps of loop processing S110, loop processing S160, image input processing S120, detecting processing S130, candidate integration processing S140, image clipping processing S150, image classification processing S810, learning image display processing S820, and image selection processing S830, and inputs or outputs data such as raw image data D110, detected data D120, and learning image data D130.

The processing from fetching of a raw image from the raw image data D110 to clipping of the learning image candidates (steps S110 to S160), the raw image data D110, detected data D120, and learning image data D130 are identical to those in the first embodiment. Therefore, description thereof will be omitted.

In addition, a configuration of the classifier learning image production system of the second embodiment is identical to that of the first embodiment. Therefore, the description thereof will be omitted.

After clipping of the learning image candidates is completed by repeating the processing of steps S120 to S150, the image classification processing in accordance with the second embodiment is executed (step S810). The image classification processing will be detailed later.

Thereafter, the learning image display processing in accordance with the second embodiment is executed (step S820). The learning image display processing will be detailed later.

Finally, the image selection processing by the user (and image file output processing) is carried out (step S830). The image selection processing will be detailed later.

Namely, the classification processing and the display processing in the second embodiment, which are different from those in the first embodiment, are suitable for manual image selection by the user, reducing a load of the user due to work of learning image selection.

Figure 9:
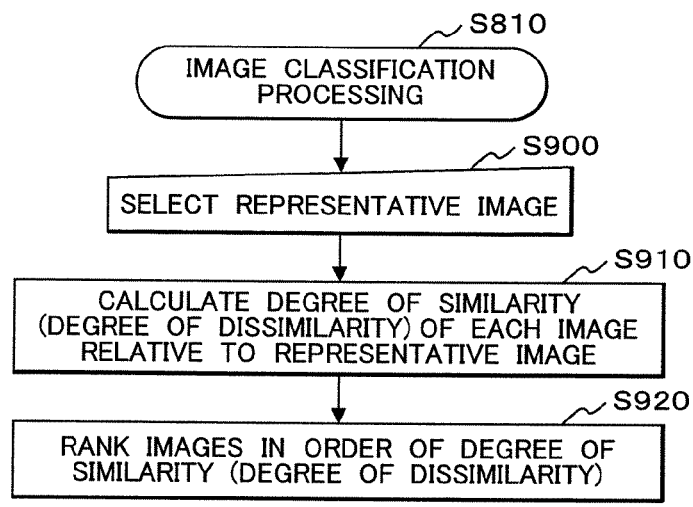
FIG. 9 is a flowchart of image classification processing in accordance with the second embodiment.

FIG. 9 shows a flow of the image classification processing S810 in accordance with the second embodiment.

An image (representative image) is selected by the user as a representative example of images to be acquired and the selected representative image is inputted (step S900). The user may use as the representative image an image selected from among the learning image candidates, or may use a differently prepared image.

Thereafter, a degree of similarity or a degree of dissimilarity of each of the images of the learning image candidates is calculated relative to the representative image (step S910). Either of the degree of similarity or the degree of dissimilarity may be calculated, or both of them may be calculated. In a description below, the degree of similarity is calculated and used to select the representative image. When the degree of dissimilarity is adopted, a description that "the degree of similarity is high" should be appropriately interpreted as that "the degree of dissimilarity is low" and so on.

For calculation of the degree of similarity or the degree of dissimilarity, a known method may be adopted. For example, a correlation value obtained by a normalized cross correlation method may be employed, or a degree of dissimilarity obtained by SSD (sum of squared differences) or SAD (sum of absolute differences) may be employed.

Thereafter, the learning image candidates are ranked in order of the degree of similarity (step S920).

Figure 10:
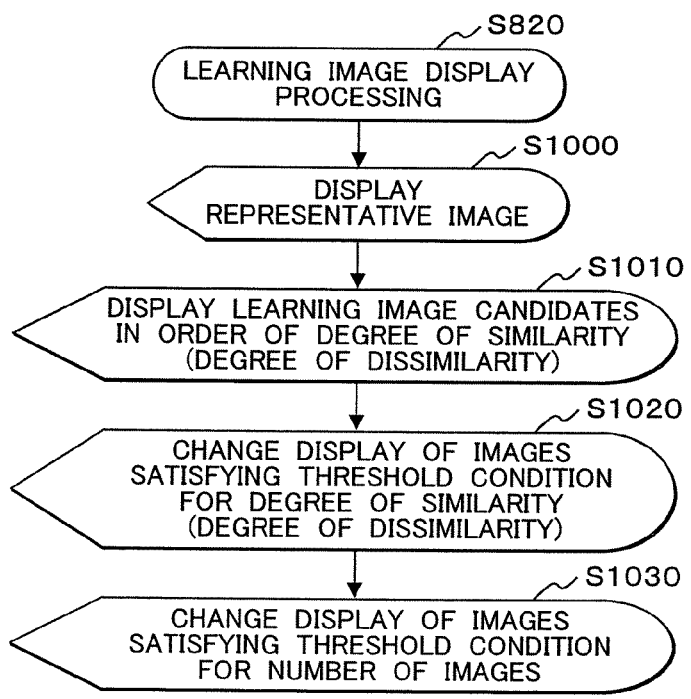
FIG. 10 is a flowchart of learning image display processing in accordance with the second embodiment.

FIG. 10 shows a flow of the learning image display processing S820 in accordance with the second embodiment.

The representative image selected by the user is displayed as a reference image (step S1000).

Thereafter, the learning image candidates are displayed in order of the degree of similarity (step S1010). A concrete example of display is as follows. When the learning image candidates are ranked in order of the degree of similarity, they are sorted and displayed in descending order of the degree of similarity. When the learning image candidates are ranked in order of the degree of dissimilarity, they are sorted and displayed in ascending order of the degree of dissimilarity. In short, the images more similar to the representative image are sorted and displayed in more upper part of the screen. Along with the images, the degrees of similarity (or degrees of dissimilarity) thereof relative to the representative image are displayed.

Thereafter, the display (displayed state) of the images satisfying a given threshold condition for the degree of similarity is changed (step S1020), and the display of the images satisfying a given threshold condition for the number of images is changed (step S1030). Examples of these displays will be described with reference to FIG. 11.

Figure 11:
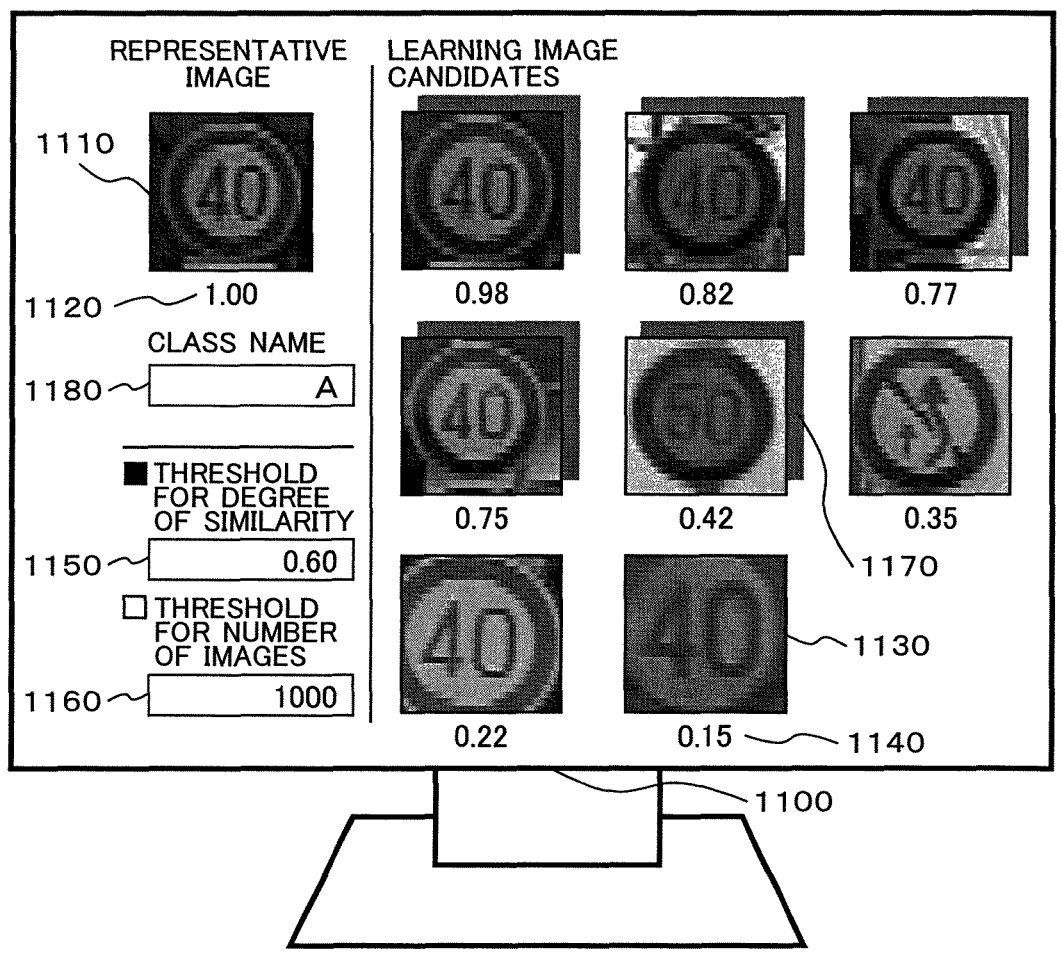
FIG. 11 shows an example of a learning image display screen in the second embodiment.

FIG. 11 shows an example of a learning image display screen employed in the second embodiment. In the learning image display screen 1100 in the second embodiment, a reduced representative image 1110 and the degree of similarity thereof 1120 are displayed as display information concerning the representative image. Since the degree of similarity is a degree of similarity relative to the representative image, the degree of similarity 1120 of the representative image 1110 is 1.00 (=100%). In addition, reduced learning image candidates 1130 and degrees of similarity 1140 thereof are displayed as display information concerning the learning image candidates. At this time, the learning image candidates 1130 with higher degree of similarity 1140 are sorted and displayed in more upper part of the screen.

Further, a threshold for the degree of similarity and a threshold for the number of images can be set in a setting field 1150 for the threshold for the degree of similarity and a setting field 1160 for the threshold for the number of images, respectively. For the learning image candidates 1130 that satisfy the threshold conditions set in the setting fields 1150 and 1160, the display (displayed state) is automatically changed. The display of the learning image candidates 1130 may be manually changed by the user (step S830 in FIG. 8).

Incidentally, the threshold for the degree of dissimilarity can be set in the learning image display screen 1100 when the degree of dissimilarity is used to select learning images, while the threshold for the degree of similarity can be set in FIG. 11.

Now, the image selection processing S830 (FIG. 8) will be described below.

In the example shown in FIG. 11, the learning image candidates 1130 whose degrees of similarity satisfy the threshold condition (that is, the learning image candidates 1130 whose degrees of similarity are equal to or larger than 0.60) are displayed with a shadow 1170. In FIG. 11, three images on the first row and one image on the second row and the first column in the learning image display screen 1100 are displayed with a shadow 1170. The display (displayed state) of the learning image candidates is thus automatically changed. While checking a change of the display, the user can select any learning image candidate using a mouse cursor or the like. For example, the learning image candidate 1130 on the second row and the second column in the learning image display screen 1100, which has the degree of similarity of 0.42 and does not satisfy the threshold condition for the degree of similarly ($\geqq$0.60), is displayed with a shadow 1170 since the user has intentionally selected it and added it to the group of the selected learning image candidates.

The display of the learning image candidates 1130 may be automatically changed based on the threshold for the number of images. In this case, the display is automatically changed in the way that the number of learning image candidates 1130 corresponding to the number which has been set as the threshold for the number of images are displayed with a shadow in descending order of the degree of similarity. The display of the learning image candidates 1130 can be manually changed by the user even when the display is changed based on the threshold for the number of images.

Finally, a class name entered in a class name input field 1180 in the learning image display screen 1100 is assigned to the learning image candidates 1130 whose display has been changed. The learning image candidates 1130 are outputted as image files (step S830 in FIG. 8), and thereby final learning images are determined. The final learning images are recorded in the learning image data D130.

In the learning image display screen 1100 in FIG. 11, the display with a shadow is taken as an example of a way of changing the display. Alternatively, any other display changing method can be adopted. For example, the thickness or color of the frame of an image may be changed. Alternatively, a check box being prepared by the side of each image, the check box for a concerned image may be brought to a selected state in order to change the display.

At step S1010 or in FIG. 11, the learning image candidates are displayed in descending order of the degree of similarity (or in ascending order of the degree of dissimilarity). Alternatively, the learning image candidates may be displayed in ascending order of the degree of similarity (or in descending order of the degree of dissimilarity). This alternative is useful in a case where a noise image should be deleted or an image dissimilar to the representative image (i.e. an incorrect image) should be selected.

According to the configuration of the second embodiment, once a very small number of the correct images (representative images) are prepared, work of collecting a large number of the learning images similar to the correct images can be readily achieved. This advantage is effective in a case where the number of dimensions of features employed in discrimination is large and numerous learning images are necessary.

Third Embodiment

Another embodiment of a classifier learning image production program, a classifier learning image production method, and a classifier learning image production system in accordance with the present invention will be described below with reference to FIG. 12 to FIG. 15.

In the present embodiment, an example will be described where, during still image processing, candidates for the learning images are automatically acquired but final selection of whether adopting the candidates as the learning images is manually made by a user. The present embodiment is, similarly to the second embodiment, useful in a case where performance of detecting processing is poor, such as in an early stage of development of an image recognition algorithm, and can be applied to a case where input images are still images, such as defective determination in a field of FA.

Figure 12:
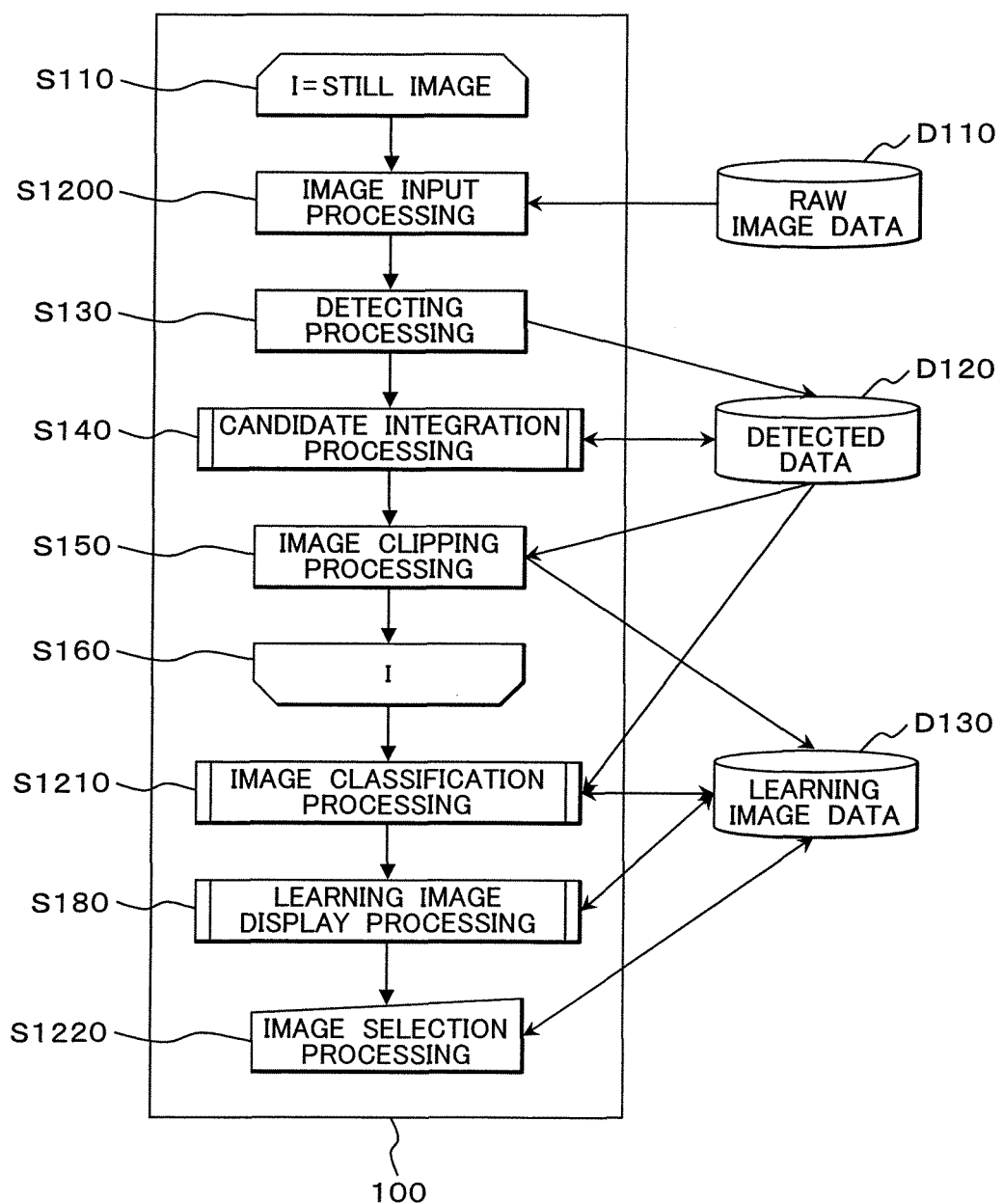
FIG. 12 is a diagram outlining a classifier learning image production program in accordance with a third embodiment of the present invention and data processing.

Referring to FIG. 12, overall processing by the classifier learning image production program of the third embodiment will be outlined below. The classifier learning image production program 100 of the third embodiment includes processing steps of loop processing S110, loop processing S160, image input processing S1200, detecting processing S130, candidate integration processing S140, image clipping processing S150, image classification processing S1210, learning image display processing S180, and image selection processing S1220, and inputs or outputs data such as raw image data D110, detected data D120, and learning image data D130.

The processing from fetching of a raw image from the raw image data D110 to clipping of the learning image candidates (steps S110 to S160) are identical to those in the first and second embodiment. However, the image input processing (step S1200) is different. The loop processing S110 and S160 allow the processing of steps S1200 to S150 to be repeated for still images I. The learning image display processing S180, the raw image data D110, and the learning image data D130 are identical to those in the first embodiment, but the detected data D120 is different.

The image input processing S1200, the image classification processing S1210, the image selection processing S1220, and the detected data D120 will be described later. The description will be omitted for the processing (steps S110, S130 to S160, and S180) and the data (D110 and D130) which are identical to those in the first embodiment.

In addition, a configuration of the classifier learning image production system of the third embodiment is identical to that of the first embodiment. Therefore, the description thereof will be omitted.

Now, the image input processing S1200 will be described below. In the image input processing S120 (FIG. 1 and FIG. 8) in the first and second embodiment, one still image clipped from frames of a motion picture is inputted. In the image input processing S1200 in the third embodiment, one still image is read from the raw image data D110 and inputted as a raw image (step S1200).

After clipping of learning image candidates is completed through the processing of steps S110 to S160, the image classification processing in accordance with the third embodiment is executed (step S1210). The image classification processing will be detailed later.

Thereafter, the learning image display processing identical to that of the first embodiment is executed (step S180).

Finally, the image selection processing in accordance with the third embodiment is carried out (step S1220). The image selection processing will be detailed later.

Namely, in the third embodiment, the learning image candidates are clipped from a still image, not from a motion picture, and the image classification processing and the image selection processing, which are different from those in the first and second embodiment, are performed, reducing a load of the user due to work of learning image selection.

Figure 13:
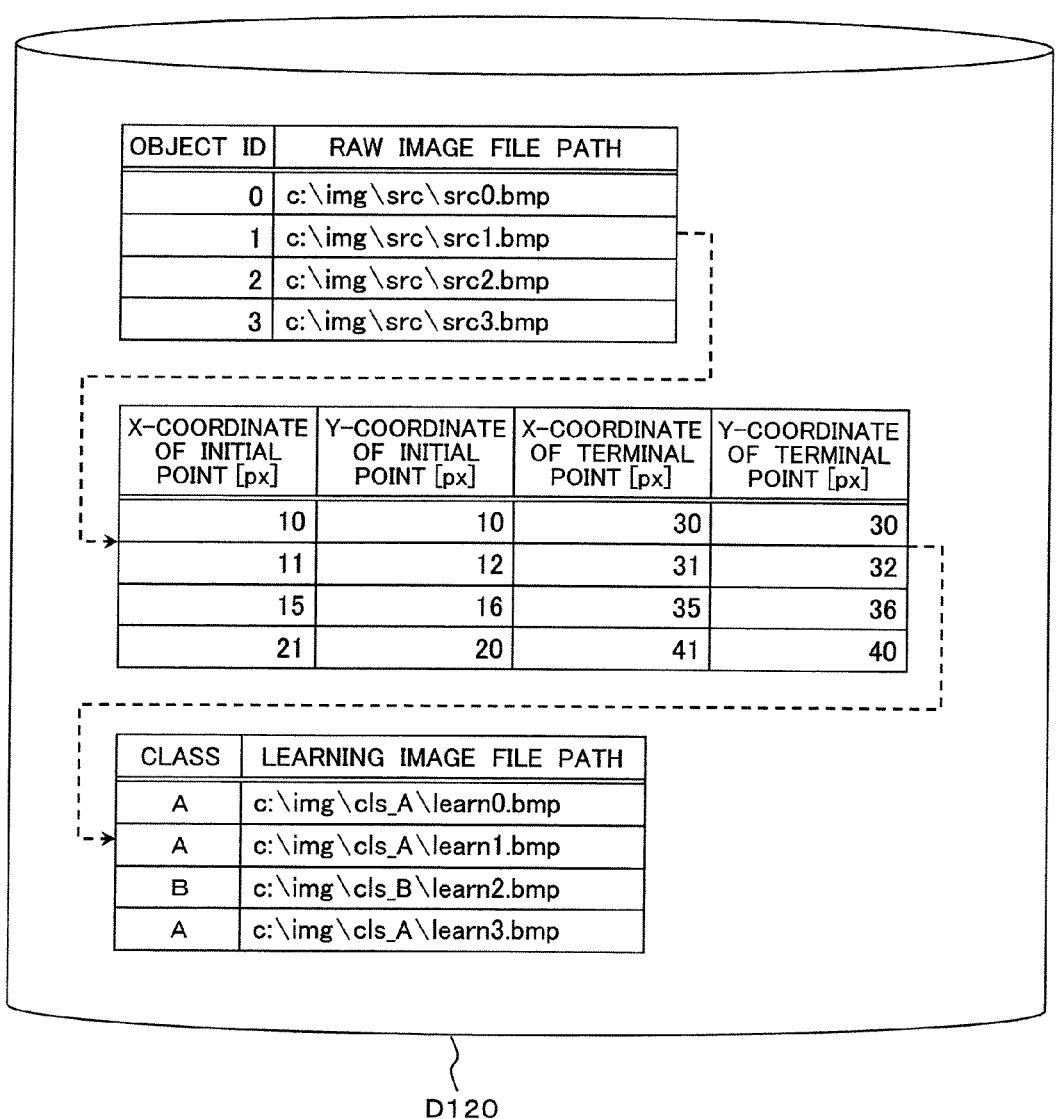
FIG. 13 is a diagram showing a data structure and an example of detected data in third embodiment.

FIG. 13 shows a data structure and an example of the detected data D120 employed in the third embodiment. The detected data D120 in the third embodiment includes as object information, similarly to that in the first and second embodiment, an object ID, positional information on the object, class information, and a path to the learning image file. The detected data D120 in the third embodiment is different from that in the first and second embodiment in a point that an object-detected time is not included and a raw image file path is included.

In the first and second embodiment, the object-detected time is included in the detected data D120 in order to clip a still image corresponding to a certain time from a motion picture in the raw image data D110 and input the still image as a raw image. The present embodiment is an example applied to still image processing. In order to input an image, file path information on a still image to be used as a raw image is needed. The detected data D120 includes the raw image file path as the file path information.

FIG. 13 has a table divided into three portions for convenience, but an actual table has each line extended in a row for each object ID.

Figure 14:
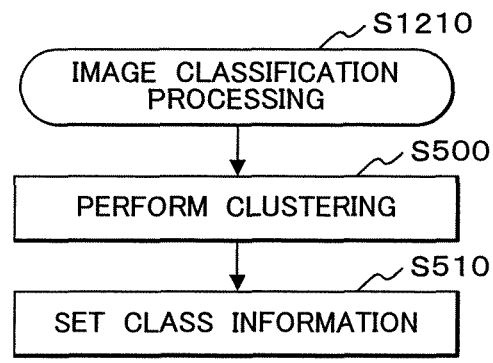
FIG. 14 is a flowchart of image classification processing in accordance with the third embodiment.

FIG. 14 shows a flow of the image classification processing S1210 in accordance with the third embodiment. In the image classification processing S1210, similarly to the image classification processing S170 in the first embodiment, clustering processing (step S500) is performed on a group of partial images (learning image candidates) clipped through the image clipping processing S150, and the class information setting processing is performed (step S510). A difference from the image classification processing S170 of the first embodiment lies in a point that the leaning image files are not outputted at this time point. The concrete processing of the clustering processing (step S500) and the class information setting processing (step S510) is identical to that in the first embodiment.

Figure 15:
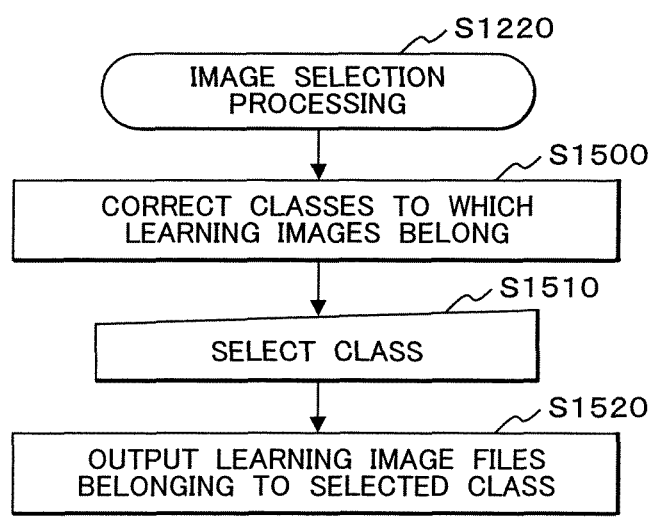
FIG. 15 is a flowchart of image selection processing in accordance with the third embodiment.

FIG. 15 shows a flow of the image selection processing S1220 in accordance with the third embodiment.

First, a learning image display screen identical to the learning image display screen 700 shown in FIG. 7 is displayed through the learning image display processing S180, which is a preceding processing in the overall processing shown in FIG. 12. In the learning image display screen, a user manipulates a mouse cursor or the like to correct the classes to which the learning images belong (step S1500). More particularly, an image classified into an improper class is moved to a field of a proper class in the learning image display screen.

Thereafter, after a class whose images are outputted as a group of the learning images is selected by the user (step S1510), a group of the learning image files belonging to the selected class is outputted as the learning images (step S1520).

According to the third embodiment, rough classification into classes is automatically performed by a computer. If there is an error in the classification, a user can correct the classification and output the learning images belonging to a desired class. This advantage is effective especially in a case where, the number of classes being large, the number of samples of the learning image largely differs among classes and the number of images belonging to a specific class should be increased.

In the present invention, any one of the processing steps in any of the aforesaid embodiments may be divided into two or more processing steps, and two or more arbitrary processing steps may be integrated into one processing step. Further, in a computer environment which executes the processing in the aforesaid embodiments, an arbitrary one of processing units (functional hardware blocks in which the processing steps are executed) included in any of the aforesaid embodiments may be divided into two or more processing units, and two or more arbitrary processing units may be integrated into one processing unit. The aforesaid embodiments do not restrict the implementation form of the present invention as long as the features of the present invention are not impaired.

What is claimed is:

1. A classifier learning image production program allowing a computer to execute the steps of:
inputting an image from a storage device or an image pickup device;
detecting a discrimination area from the inputted image, acquiring a plurality of detected data including at least coordinate information on the discrimination area, and recording the detected data in a storage device;
integrating the plurality of detected data so as to obtain learning image candidate information, and recording the learning image candidate information as the detected data in the storage device;
clipping a plurality of learning images from the inputted images using the coordinate information included in the detected data, the learning images being necessary for a classifier to learn, outputting the plurality of the learning images as learning image data, and recording the learning image data in the storage device;
classifying the learning images into one or more sets; and
displaying the learning images on a display device,
said program further allowing a computer to execute a step of prompting a user to select the learning images displayed at the step of displaying,
wherein the step of prompting comprises:
prompting the user to select the learning images according to segments into which the learning images are classified at the step of classifying, or to select one or more learning images from among the learning images displayed at the step of displaying, and
outputting the learning images selected by the user as learning image data and recording the learning image data in the storage device
wherein the step of detecting comprises:
recording, in each of the detected data as raw image specification information, time information if the image inputted at the step of inputting is a motion picture and a filename if the image inputted at the step of inputting is a still image, and
recording, in each of the detected data as discrimination area specification information, coordinate information on the discrimination area in an image space of the image or coordinate information thereon in a three-dimensional real space; and
wherein the step of classifying comprises:

recording, in each of the detected data, class information on a class to which each of the learning images belongs and a file name of each of the learning images wherein the step of integrating comprises:

integrating the plurality of detected data representing the same discrimination area in the same image by using the raw image specification information and the discrimination area specification information in each of the detected data so as to determine are representative area, and regarding information on the representative area as the learning image candidate information;

wherein the step of classifying comprises:

adding class information to be employed in learning of the classifier to each of the sets;

wherein the step of classifying comprises:

clustering the learning images to produce clusters as the sets, and adding the class information to be employed in learning of the classifier to each of the clusters, and recording the learning images in units of each of the clusters in the storage device.

2. A classifier learning image production program allowing a computer to execute the steps of:

inputting an image from a storage device or an image pickup device;

detecting a discrimination area from the inputted image, acquiring a plurality of detected data including at least coordinate information on the discrimination area, and recording the detected data in a store device;

integrating the plurality of detected data so as to obtain learning image candidate information, and recording the learning image candidate information as the detected data in the storage device;

clipping a plurality of learning images from the inputted images using the coordinate information included in the detected data, the learning images being necessary for a classifier to learn, outputting the plurality of the learning images as learning image data, and recording the learning image data in the storage device;

classifying the learning images into one or more sets; and displaying the learning images on a display device, said program further allowing a computer to execute a step of prompting a user to select the learning images displayed at the step of displaying, wherein the step of prompting comprises:

prompting the user to select the learning images according to segments into which the learning images are classified at the step of classifying, or to select one or more learning images from among the learning images displayed at the step of displaying, and outputting the learning images selected by the user as learning image data and recording the learning image data in the storage device wherein the step of detecting comprises:

recording, in each of the detected data as raw image specification information, time information if the image inputted at the step of inputting is a motion picture and a file name if the image inputted at the step of inputting is a still image, and recording, in each of the detected data as discrimination area specification information, coordinate information on the discrimination area in an image space of the image or coordinate information thereon in a three-dimensional real space; and wherein the step of classifying comprises:

recording, in each of the detected data, class information on a class to which each of the learning images belongs and a file name of each of the learning images wherein the step of integrating comprises:

integrating the plurality of detected data representing the same discrimination area in the same image by using the raw image specification information and the discrimination area specification information in each of the detected data so as to determine a representative area, and regarding information on the representative area as the learning image candidate information;

wherein the step of classifying comprises:

adding class information to be employed in learning of the classifier to each of the sets, wherein the step of classifying comprises:

inputting a representative image to be used as a classification criterion, calculating a degree of similarity or a degree of dissimilarity of each of the plurality of the learning images relative to the representative image, each of the plurality of the learning images being clipped at the step of clipping, sorting the plurality of the learning images in descending order of the degree of similarity or in ascending order of the degree of dissimilarity, and displaying the sorted learning images on the display device, and recording one or more learning images selected by a user in the storage device as the learning images belonging to the same class.

3. A classifier learning image production program allowing a computer to execute the steps of:

inputting an image from a storage device or an image pickup device;

detecting a discrimination area from the inputted image, acquiring a plurality of detected data including at least coordinate information on the discrimination area, and recording the detected data in a storage device;

integrating the plurality of detected data so as to obtain learning image candidate information, and recording the learning image candidate information as the detected data in the storage device;

clipping a plurality of learning images from the inputted images using the coordinate information included in the detected data, the learning images being necessary for a classifier to learn, outputting the plurality of the learning images as learning image data, and recording the learning image data in the storage device;

classifying the learning images into one or more sets; and displaying the learning images on a display device, said program further allowing a computer to execute a step of prompting a user to select the learning images displayed at the step of displaying, wherein the step of prompting comprises:

prompting the user to select the learning images according to segments into which the learning images are classified at the step of classifying, or to select one or more learning images from among the learning images displayed at the step of displaying, and outputting the learning images selected by the user as learning image data and recording the learning image data in the storage device wherein the step of detecting comprises:

recording, in each of the detected data as raw image specification information, time information if the image inputted at the step of inputting is a motion picture and a file name if the image inputted at the step of inputting is a still image, and recording, in each of the detected data as discrimination area specification information, coordinate information on the discrimination area in an image space of the image or coordinate information thereon in a three-dimensional real space; and wherein the step of classifying comprises:

recording in each of the detected data class information on a class to which each of the learning images belongs and a file name of each of the learning images wherein the step of integrating comprises:

integrating the plurality of detected data representing the same discrimination area in the same image by using the raw specification information and the discrimination area specification information in each of the detected data so as to determine a representative area, and regarding information on the representative area as the learning image candidate information;

wherein the step of classifying comprises:

adding class information to be employed in learning of the classifier to each of the sets, wherein the step of classifying comprises:

inputting a representative image to be used as a classification criterion, calculating a degree of similarity or a degree of dissimilarity of each of the plurality of the learning images relative to the representative image, each of the plurality of the learning images being clipped at the step of clipping, sorting the plurality of the learning images in ascending order of the degree of similarity or in descending order of the degree of dissimilarity, and displaying the sorted learning images on the display device, and recording one or more learning images selected by a user in the storage device as the learning images belonging to the same class.

4. A classifier learning image production program allowing a computer to execute the steps of:

inputting an image from a storage device or an image pickup device;

detecting a discrimination area from the inputted image, acquiring a plurality of detected data including at least coordinate information on the discrimination area, and recording the detected data in a storage device;

integrating the plurality of detected data so as to obtain learning image candidate information, and recording the learning image candidate information as the detected data in the storage device;

clipping a plurality of learning images from the inputted images using the coordinate information included in the detected data, the learning images being necessary for a classifier to learn, outputting the plurality of the learning images as learning image data, and recording the learning image data in the storage device;

classifying the learning images into one or more sets; and displaying the learning images on a display device, said program further allowing a computer to execute a step of prompting a user to select the learning images displayed at the step of displaying, wherein the step of prompting comprises:

prompting the user to select the learning images according to segments into which the learning images are classified at the step of classifying, or to select one or more learning images from among the learning images displayed at the step of displaying, and outputting the learning images selected by the user as learning image data and recording the learning image data in the storage device wherein the step of detecting comprises:

recording, in each of the detected data as raw image specification information, time information if the image inputted at the step of inputting is a motion picture and a file name is the image inputted at the step of inputting is a still image, and recording, in each of the detected data as discrimination are specification information, coordinate information on the discrimination area in an image space of the image or coordinate information thereon in a three-dimensional real space; and wherein the step of classifying comprises:

recording, in each of the detected data, class information on a class to which each of the learning images belongs and a file name of each of the learning images wherein the step of integrating comprises:

integrating the plurality of detected data representing the same discrimination area in the same image by using the raw image specification information and the discrimination area specification information in each of the detected data so as to determine a representative area, and regarding information on the representative area as the learning image candidate information;

wherein the step of classifying comprises:

adding class information to be employed in learning of the classifier to each of the sets, wherein the step of classifying comprises:

clustering the learning images to produce clusters as the sets, and adding the class information to be employed in learning of the classifier to each of the clusters, displaying the learning images in units of the class information on the display device prompting a user to correct the class information and select a class, and recording the learning images belonging to the class selected by the user in the storage device as the learning images belonging to the same class.

5. A classifier learning image production program allowing a computer to execute the steps of:

inputting an image from a storage device or an image pickup device;

detecting a discrimination area from the inputted image, acquiring a plurality of detected data including at least coordinate information on the discrimination area, and recording the detected data in a storage device;

integrating the plurality of detected data so as to obtain learning image candidate information, and recording the learning image candidate information as the detected data in the storage device;

clipping a plurality of learning images from the inputted images using the coordinate information included in the detected data, the learning images being necessary for a classifier to learn, outputting the plurality of the learning images as learning image data, and recording the learning image data in the storage device;

classifying the learning images into one or more sets; and displaying the learning images on a display device, said program further allowing a computer to execute a step of prompting a user to select the learning images displayed at the step of displaying, wherein the step of prompting comprises:

prompting the user to select the learning images according to segments into which the learning images are classified at the step of classifying, or to select one or more learning images from among the learning images displayed at the step of displaying, and outputting the learning images selected by the user as learning image data and recording the learning image data in the storage device wherein the step of detecting comprises:

recording, in each of the detected data as raw image specification information, time information on the discrimination area in an image space of picture and a file name if the image inputted at the step of inputting is a still image, and recording, in each of the detected data as discrimination area specification information, coordinate information on the discrimination area in an image space of the image or coordinate information thereon in a three-dimensional real space; and wherein the step of classifying comprises:

recording, in each of the detected data, class information on a class to which each of the learning images belongs and a file name of each of the learning images wherein the step of integrating comprises:

integrating the plurality of detected data representing the same discrimination area in the same image by using the raw image specification information and the discrimination area specification information in each of the detected data so as to determine a representative area, and regarding information on the representative area as the learning image candidate information;

wherein the step of classifying comprises:

adding class information to be employed in learning of the classifier to each of the sets;

wherein the step of classifying comprises:

clustering the learning images to produce clusters as the sets, and adding the class information to be employed in learning of the classifier to each of the clusters, and recording the learning images in unity of each of the clusters in the storage device, wherein the step of displaying comprises:

displaying the plurality of the learning images clipped at the step of clipping on the display device, and differentiating displays of the plurality of the learning images in units of the class information added at the step of classifying.

6. A classifier learning image production program allowing a computer to execute the steps of:

inputting an image from a storage device or an image pickup device;

detecting a discrimination area from the inputted image, acquiring a plurality of detected data including at least coordinate information on the discrimination area and recording the detected data in a storage device.

integrating the plurality of detected data so as to obtain learning image candidate information, and recording the learning image candidate information as the detected data in the storage device;

clipping a plurality of learning images from the inputted images using the coordinate information included in the detected data, the learning images being necessary for a classifier to learn, outputting the plurality of the learning images as learning image data, and recording the learning image data in the storage device;

classifying the learning images into one or more sets; and displaying the learning images on a display device, said program further allowing a computer to execute a step of prompting a user to select the learning images displayed at the step of displaying, wherein the step of prompting comprises:

prompting the user to select the learning images according to segments into which the learning images are classified at the step of classifying, or to select one or more learning images from among the learning images displayed at the step of displaying, and outputting the learning images selected by the user as learning image data and recording the learning image data in the storage device wherein the step of detecting comprises:

recording, in each of the detected data as raw image specification information, time information if the image inputted at the step of inputting is a motion picture and a file name if the image inputted at the step of inputting is a still image, and recording in each of the detected data as discrimination area specification information, coordinate information on the discrimination area in an image space of the image or coordinate information thereon in a three-dimensional real space; and wherein the step of classifying comprises:

recording in each of the detected data, class information on a class to which each of the learning images belongs and a file name of each of the learning images wherein the step of integrating comprises:

integrating the plurality of detected data representing the same discrimination area in the same image by using the raw image specification information and the discrimination area specification information in each of the detected data so as to determine a representative area, and regarding information on the representative area as the learning image candidate information;

wherein the step of classifying comprises:

adding class information to be employed in learning of the classifier to each of the sets, wherein the step of classifying comprises:

inputting a representative image to be used as a classification criterion, calculating a degree of similarity or a degree of dissimilarity of each of the plurality of the learning images relative to the representative image, each of the plurality of the learning images being clipped at the step of clipping, sorting the plurality of the learning images in descending order of the degree of similarity or in ascending order of the degree of dissimilarity, and displaying the sorted learning images on the display device, and recording one or more learning images selected by a user in the storage device as the learning images belonging to the same class, wherein the step of displaying comprises:

displaying the representative image, displaying the plurality of the learning images clipped at the step of clipping and the degree of similarity or the degree of dissimilarity on the display device, prompting a user to enter a class name to which the representative image belongs, prompting the user to enter, as a threshold condition, one or both of a threshold of the degree of similarity or the degree of dissimilarity and a threshold of the number of images, and changing displays of the learning images that satisfies the threshold condition.

\* \* \* \* \*